Dec. 13, 1960   G. GAGLIARDI   2,964,253
ARMATURE WINDING MACHINE
Filed Sept. 1, 1955   4 Sheets-Sheet 1
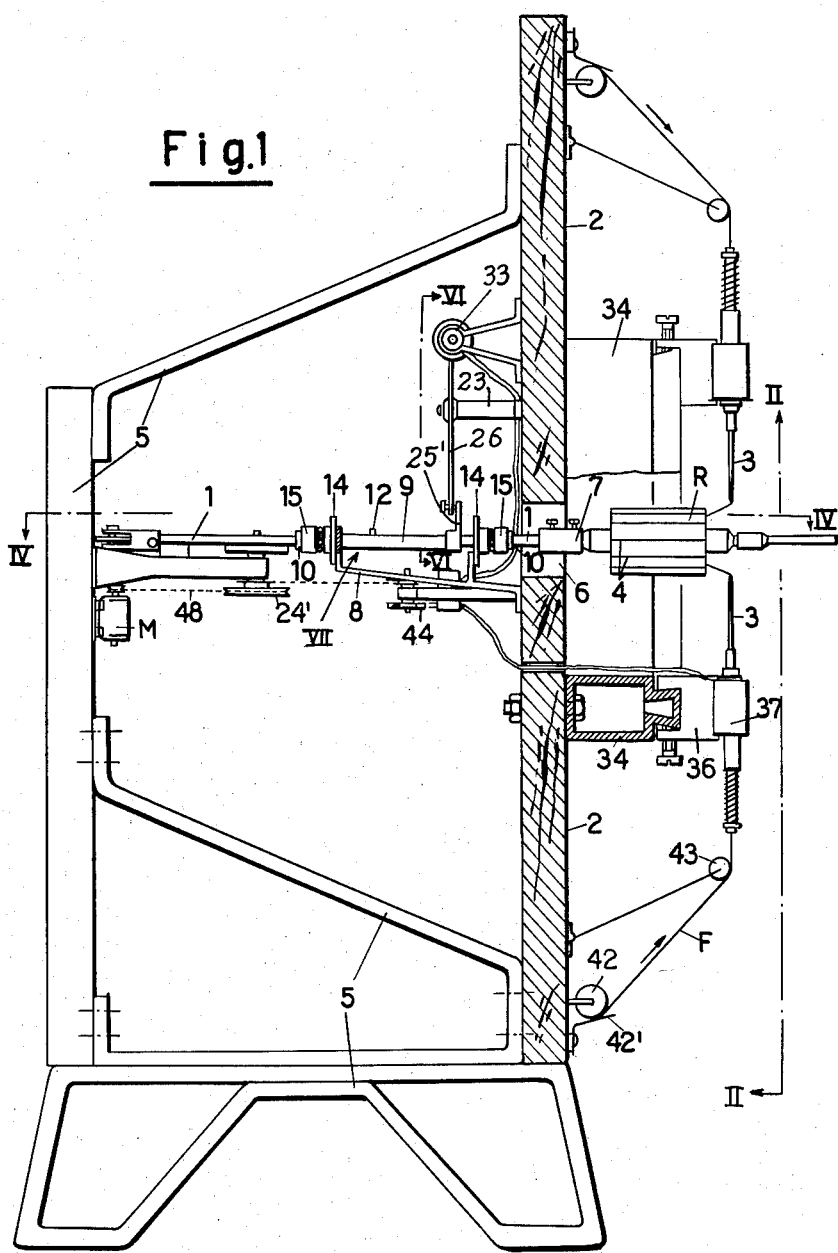
INVENTOR.
Gagliardo Gagliardi
BY
Michael S. Striker
agt.

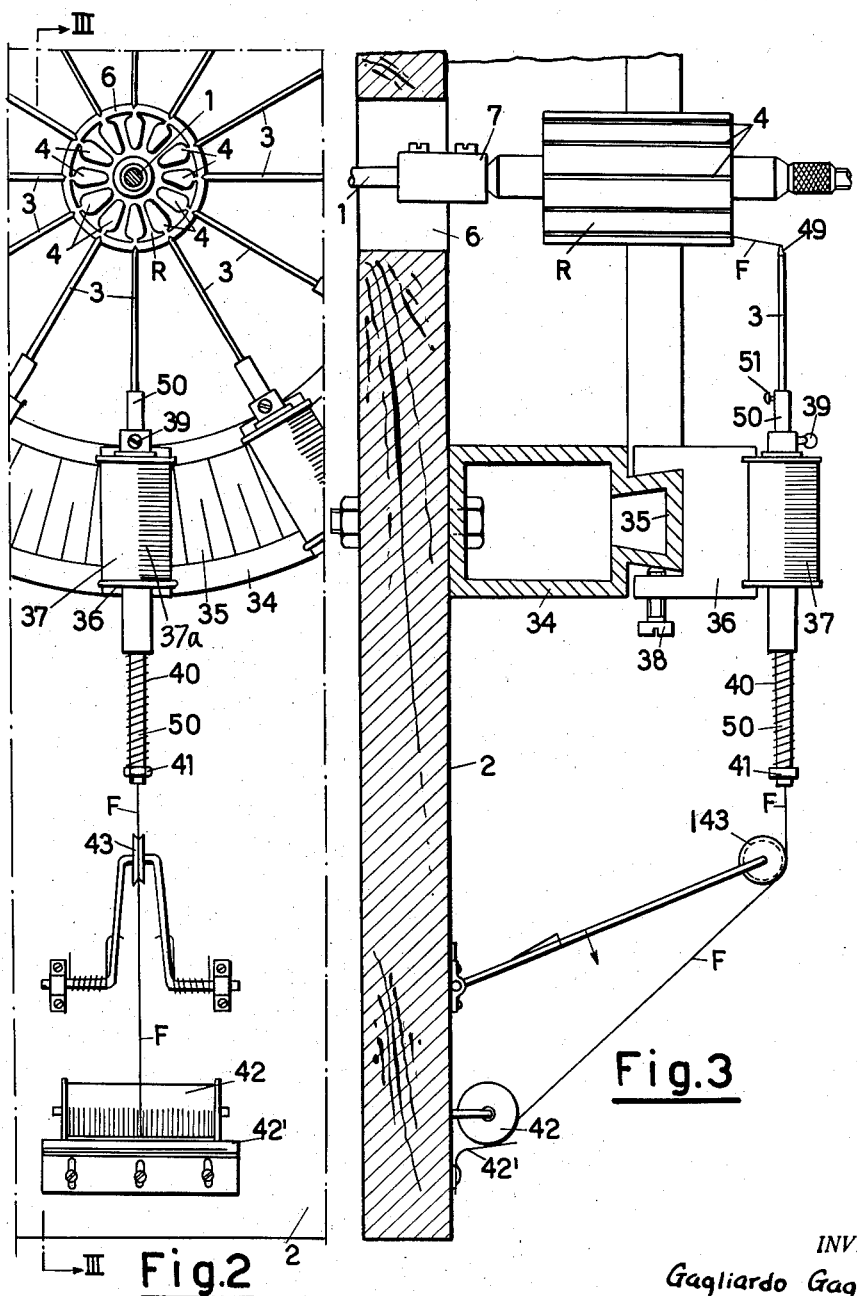

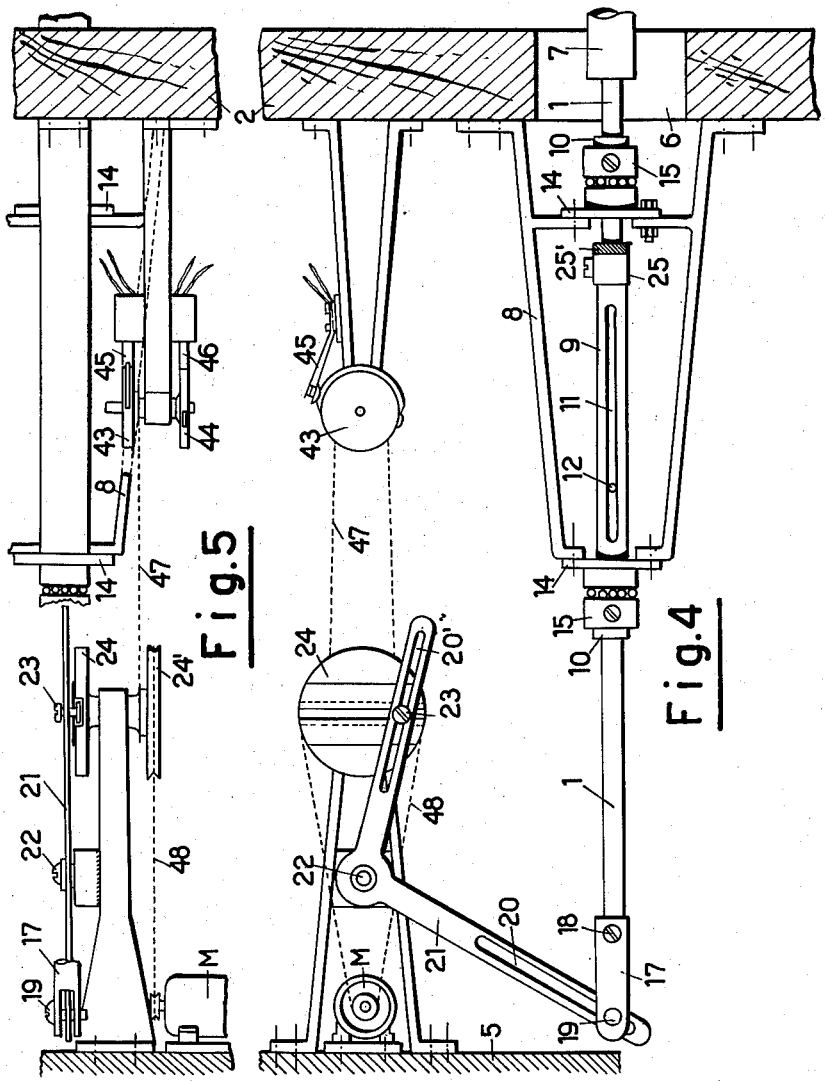

Dec. 13, 1960 G. GAGLIARDI 2,964,253
ARMATURE WINDING MACHINE
Filed Sept. 1, 1955 4 Sheets-Sheet 4

United States Patent Office 2,964,253
Patented Dec. 13, 1960

2,964,253

ARMATURE WINDING MACHINE

Gagliardo Gagliardi, Via Settembrini 26A, Milan, Italy

Filed Sept. 1, 1955, Ser. No. 531,869

Claims priority, application Italy Sept. 16, 1954

4 Claims. (Cl. 242—13)

The invention is related to a winding machine intended for the manufacture of the armature windings of electric motors.

In the machine of the invention all of the coils of the armature are wound at the same time, independent of the number of coils to be wound, and irrespective of the number of armature slots in which the turns of the winding have to be placed.

The machine of the invention comprises a frame; holding means for holding an armature having slots for receiving turns of a winding, the holding means being supported on the frame for turning movement around an axis and for reciprocating movement in an axial direction; first actuator means operatively connected to the holding means for reciprocating the same in the axial direction; second actuator means operatively connected to the holding means for turning the same so that the armature is turned and axially moved for receiving turns of wire during a winding operation; a circular mounting base carried by the frame surrounding the locality of the armature and being concentric with the axis; a plurality of wire guide units individually and detachably mounted on the mounting base, each of the wire guide units having a foot portion guided on the circular mounting base for movement about the axis and relative to the other wire guide units so that the number and angular spacing of the wire guide units can be varied in accordance with the number of slots in the armature, each wire guide unit comprising a wire guide member mounted for reciprocating movement in a radial direction with respect to the axis for leading a wire into the path of the respective slot of the armature during the movement of the holding means and a third actuating means for effecting operation of the respective wire guide member; means for attaching the foot portions of the wire guide units to the mounting base in selected angularly spaced positions; and means operatively connected to the first, second, and third actuating means for effecting operation of the same in a cyclic sequence.

The accompanying drawings show, by way of example only a preferred embodiment of the invention. In the drawings:

Figure 1 is a side elevational view of the machine, partially shown in section;

Figure 2 is a front elevational view of a portion of the front part in the region of the arrows II—II of Fig. 1;

Figure 3 is a side elevational view in the direction of the arrows III—III in Fig. 2;

Figure 4 is an enlarged plan view of an internal part of the machine, taken along line IV—IV of Fig. 1;

Figure 5 is a side view of the part shown in Fig. 4;

Figure 6:
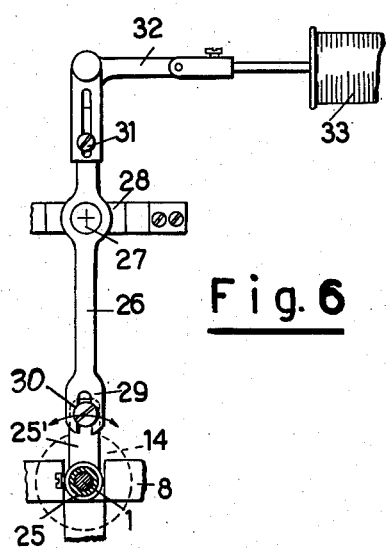
Figure 6 is an elevation showing a detail on an enlarged scale, and taken along lines VI—VI of Fig. 1.

The machine of the invention is supported by a wall 2 to which it is affixed by a frame 5. The wall and the frame are capable of supporting all the parts of the machine.

Wall 2, in front of which the operator works, may be disposed either in a vertical, horizontal, or inclined position. The vertical position, shown in the example, has proved to be the most convenient one. Through a hole 6 provided in the center of wall 2 passes the end of shaft 1 which supports, by a ferrule 7 provided to this purpose, the armature R to be provided with a winding. The mechanism proper, which is located in the rear of wall 2, is affixed thereto and to frame 5 by brackets 8 which bear shaft 1 coaxial with hole 6 of wall 2 and extending perpendicularly to wall 2.

Brackets 8 are designed so as to allow shaft 1 to have two distinct movements, namely, a lengthwise axial reciprocating movement of adjustable amplitude and an angular turning movement of adjustable amplitude.

Shaft 1 slides within a tube 9 guided by two bushings 10. On the tube 9 a lengthwise slot 11 is provided, within which a pin 12, fast to shaft 1, is slidable. This arrangement allows a sliding movement of shaft 1 within tube 9 but prevents any rotation of said shaft relative to tube 9.

As it is of paramount importance that the shaft 1 and armature R do not perform any angular movement, even thet slightest, relative to tube 9, the slot 11 of tube 9 has been fitted, for example, with two side walls 13 (see Figures 7 and 8) along its whole length. Said walls form a guide channel of such height that pin 12 is allowed to slide therein without lateral rocking, thus preventing turning movement of shaft 1 and armature R.

At each end of tube 9 two sleeves 14 are loosely mounted, the tube being turnably supported by said sleeves.

Sleeves 14 are fixed in brackets 8 which in turn are affixed to wall 2.

In the immediate neighborhood of sleeves 14 there are two flanges 15 freely rotatable on flanges 14 due to a suitable shape of the contact surfaces or the insertion of bearing balls. The two flanges 13 are fixed to tube 9 by fastening screws or other suitable means.

This device, described by way of example only, fulfils the requirement of allowing tube 9, and consequently also shaft 1 and armature R, to rotate through an angle the amplitude of which can be adjusted by means of suitable devices which will be described hereinafter.

The axial reciprocating motion of shaft 1 can be obtained by mechanical, pneumatic, hydraulic, or electromagnetic actuating means. A mechanical solution of this problem will now be described.

Figures 7, 8, 9:
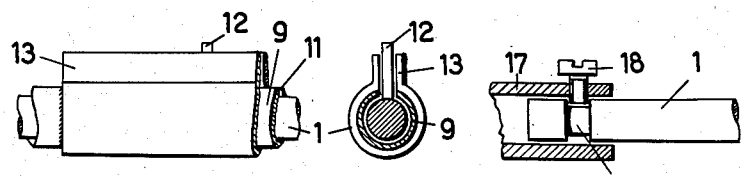
Figures 7 and 8 show, in side view and in cross-sectional view respectively a part of the machine indicated by arrow VII in Fig. 1.
Fig. 9 represents, partly in side view and partly in section, a further detail of the machine.

On the inner end of shaft 1 a peripheral groove 16 is provided and shaft 1 is freely allowed to enter an axial hole provided in bushing 17, as shown in Fig. 9. A screw 18, radially mounted on bushing 17 and tightened, penetrates a little into groove 16 of the shaft so as to allow the free rotation thereof within bushing 17 while at the same time holding the end of the shaft in bushing 17.

The opposite end of bushing 17 (Figs. 4 and 5) has flattened prongs. A screw 19 is secured to the prongs and passes through a slot of a bell crank lever 21. Thus a connection between shaft 1 and lever 21, fulcrumed at 22, is obtained which allows shaft 1 to follow the longitudinal movements imparted to said shaft by lever 21.

Lever 21 is pivoted at 22 and has another arm with a slot 20' within which a pin 23 freely slides. Pin 23 can be fixed at a suitably adjusted distance from the center of wheel 24 which is driven by motor M through belt 48. Pin 23 slides within slot 20' and causes an oscillatory movement which, through the other arm of lever 21, causes in turn the reciprocating movement of shaft 1. The amplitude of this reciprocating movement is adjusted by suitably displacing pin 23 in the radial direction of wheel 24.

The angular turning movement of shaft 1 can be obtained by several means, i.e. lever, cams, hydraulic, pneumatic or electromagnetic systems. The preferred solution is herein shown by way of example only.

A sleeve 25 is affixed to tube 9 (Figs. 4 and 6) and carries a projecting arm 25′ on the end of which a threaded hole is provided. A lever 26 pivoted at 27 to a supporting member 28 has at its lower part a fork 29 which embraces a screw 30 located in the threaded hole of the end of arm 25′, see Fig. 6. On the other end of lever 26, which can be adjusted in its length by a pin and slot connection 31, a pivoted rod 32 is mounted which is connected to the core of an electromagnet 33. When the electromagnet is energized the tube 9 is rotated in one sense and when the current is cut off, a return spring provided in the electromagnet restores the core to its previous position so that the tube is rotated in the opposite sense. It is apparent that, by increasing or decreasing the length of the lever arm, the angle of oscillation of the tube is decreased or increased respectively.

The operation of electromagnet 33 is to be synchronized with the axial reciprocating motion of shaft 1 and such synchronization can be obtained by mounting an electric contact directly on wheel 24 which controls the reciprocating motion of shaft 1.

The reciprocating radial motion of the wire-guides 3 can be obtained by several actuating means, mechanical or others.

By way of example, and also in the light of practical consideration, an electromagnetic actuating device for controlling the movement of the wire-guides is herein illustrated. The machine is capable of making the windings of a great variety of armatures, and as it is well known, there are many types of rotors and they differ from each other in accordance with the diameter of the stack of laminations, in the thickness of the stack and in the number of slots.

Wall 2 has a hole 6 for the passage of the projecting end of shaft 1 on which the armature R is to be fixed. Coaxially with hole 6 in the wall 2, one or more rings 34 suitably sized can be provided corresponding to different diameters of the armature.

A ring 34 has a projecting crown in dovetail shape 35 or having other suitable shape to serve as a mounting base and on this member the supporting member 36 of every electromagnet 37 can be mounted by detachably fixing it by screws 38 (Figs. 1, 2 and 3). The front face of ring 34 or the flat surface of wall 2 can be provided with graduations so as to facilitate the mounting around the ring of the number of electromagnets 37 necessary for winding all slots of the armature, which electromagnets must be attached to base 34 at exactly equal intervals corresponding to the slots of the armature to be wound.

The electromagnets 37, for example, comprise a coil 37a, and a hollow core surrounding a hollow member 50. In this hollow member 50 a wire carrier tube 3 is introduced and affixed to said member by a screw 51 in order to adjust the length of the tube. Tube 3 is fitted at one end with a nozzle 49, made of Bakelite, quartz or other suitable substance, for allowing the passage and the guiding of the wire. At the other end of the hollow member 50 a return spring 40 is mounted, held by a nut 41. In order to adjust the position of the hollow member 50 at the ends of its stroke, the screw 39 is provided on the hollow core of electromagnet 37.

In order to simplify the manufacture, one of the terminals of coil 37a can be connected directly to ring shaped mounting base 34 affixed to wall 2 so as to be electrically connected to mounting base 34; the other terminal of each coil 37a can be provided with a plug to be inserted into a socket of a series of sockets arranged in sufficient number corresponding to the number of electromagnets 37, or more if possible, around said ring 34. The sockets are connected to a voltage source, and ring 34 to ground. The copper wire F which is unwound from a bobbin 42 braked by spring 42′, passes over tensioning roller 43 (a device common to all coil winding machines) enters tube 3 at one end and comes out at the other end through nozzle 49, to be wound on the rotor armature R.

As in the retracted normal position nozzle 49 must be spaced from the outer surface of the rotor to an extent sufficient not to interfere with the armature R during the winding operation, and as the rotors to be wound can have different diameters, the tube 3 can be longitudinally displaced in hollow member 50 and fixed by the screw 51.

All these wire guide units 3, 50, 37 must be synchronously actuated, i.e. synchronized with the axial reciprocating motion of shaft 1 and precisely in the instants in which the shaft is in its end positions.

It would be advantageous that also the contacts for controlling the operation of these electromagnets be arranged on wheel 24 or on another wheel driven by wheel 24 in synchronism therewith. A solution of the problem is provided (see Figs. 4 and 5) by two discs 43—44, which are fitted with suitably located cams so as to actuate, respectively, the electromagnet 33 for the rotation and all the electromagnets 37 at the same time through contacts 45—46. The discs are rotated by a chain 47 connected to pulley 24′ which in turn is driven by motor M through chain 48.

The operation of winding the armature is as follows:

Shaft 1 which gears armature R is, initially, in a rear position, that is to say that the rotor is as near to wall 2 as possible so that the wire guides 3 are in front of the front end of core R. The free ends of the wires which come out of the wire guides 3 are at first fixed to shaft carrying armature R by winding them therearound; thus every wire which extends radially to the axis of armature R to the opening of the wire guide 3 is exactly in front of the open end of a slot 4 of the core.

At this stage the shaft 1 performs an advance movement (toward the right in Figure 1) so that all the wires coming out of the different wire carriers or guides 3 are laid inside the slots 4. The advance movement of shaft 1 is terminated when the ends of the wire carriers 3 are in positions opposed to the starting position, i.e. at the rear ends of the respective slots. Now the wire carriers 3 are all shifted inwardly towards shaft 1 and armature R is angularly displaced, rotating about its axis an angle corresponding to the angular distance between the slots which receive the winding and to the pitch of the winding. On completion of the angular displacement of armature R, the wire carriers 3 are retracted to the original position and shaft 1 effects a backward movement returning to the initial position.

Owing to said angular displacement, the wires F are laid in their respective slots, displaced with respect to the former slots according to the predetermined pitch. The wire carriers 3 repeat the inward movement, shaft 1 is rotated in the sense opposite to the former sense and through an angle equal to the former angle, the wire carriers 3 are brought back to the initial position and shaft 1 is axially displaced away from wall 2 thus laying the wires again in the former slots for completing a turn of the winding. This sequence of movements is repeated for the number of turns necessary to complete the winding, which can be controlled through a common revolution counter of conventional type. Should the armature be of the type having helical grooves, it is apparent that the device of Fig. 6 which drives the core in a rotary motion, must be replaced by a driving device, for instance actuated by cams, so as to cause the displacement of the core in two stages, namely, a first displacement by a certain angle at the end of the stroke, corresponding to the coiling pitch, and a second displacement angular and progressive, corresponding to the pitch angle of the helix of the slots, while both displacements take place during the longitudinal advancements of armature R.

What I claim is:

1. An armature winding machine comprising, in combination, a frame; holding means supported on said frame for turning movement around an axis and for reciprocating movement in an axial direction, said holding means being adapted to hold at one end thereof an armature to be wound; first actuator means operatively connected to said holding means for reciprocating the same in said axial direction; second actuator means operatively connected to said holding means for turning the same so that the armature is turned and axially moved for receiving turns of wire during the winding operation; an annular mounting base having a crown portion of dove-tailed cross-section, carried by said frame concentric with and substantially surrounding the locality of said armature, said mounting base being provided with a graduated scale subdividing the periphery thereof; a plurality of wire guide units individually and detachably mounted on said annular mounting base and for movement around said axis, each wire guide unit comprising a wire guide member mounted for reciprocating movement in substantially radial direction with respect to said axis and adapted to lead a wire into the path of a respective portion of the armature during the movement of said holding means, and further comprising third actuating means including electromagnetic coil means surrounding said wire guide member so as to constitute therewith an electromagnetic unit operable for electromagnetically reciprocting said guide member, and a foot portion for said coil means with means for engaging said crown portion in dovetail relationship therewith for supporting and mounting said elec-tromagentic unit adjustably along the periphery of said annular mounting base; and means operatively connected to said first, second and third actuating means for effecting operation of the same in a cyclic sequence.

2. An armature winding machine comprising, in combination, a frame; holding means for holding an armature having slots for receiving turns of a winding, said holding means being supported on said frame for turning movement around an axis and for reciprocating movement in an axial direction; first actuator means operatively connected to said holding means for reciprocating the same in said axial direction; second actuator means operatively connected to said holding means for turning the same so that the armature is turned and axially moved for receiving turns of wire during a winding operation; a circular mounting base carried by said frame surrounding the locality of said armature and being concentric with said axis; a plurality of wire guide units individually and detachably mounted on said mounting base, each of said wire guide units having a foot portion guided on said circular mounting base for movement about said axis and relative to the other wire guide units so that the number and angular spacing of said wire guide units can be varied in accordance with the number of slots in the armature, each wire guide unit comprising a wire guide member mounted for reciprocating movement in radial direction with respect to said axis for leading a wire into the path of the respective slot of the armature during the movement of said holding means and a third actuating means for effecting operation of the respective wire guide member; means for attaching said foot portions of said wire guide units to said mounting base in selected angularly spaced positions; and means operatively connected to said first, second, and third actuating means for effecting operation of the same in a cyclic sequence.

3. A winding machine as set forth in claim 2 wherein said third actuating means is an electro-magnetic coil means.

4. A armature winding machine comprising, in combination, a frame; holding means for holding an armature having slots for receiving turns of a winding, said holding means being supported on said frame for turning movement around an axis and for reciprocating movement in an axial direction; first actuator means operatively connected to said holding means for reciprocating the same in said axial direction; second actuator means operatively connected to said holding means or turning the same so that the armature is turned and axially moved for receiving turns of wire during a winding operation; a mounting base carried by said frame and having a circular crown portion of dove-tailed cross section surrounding the locality of said armature and being concentric with said axis; a plurality of wire guide units individually and detachably mounted on said mounting base, each of said wire guide units having a foot portion formed with a recess matching said dove-tailed crown portion and being slidably guided on the same for movement about said axis and relative to the other wire guide units so that the number and angular spacing of said wire guide units can be varied in accordance with the number of slots in the armature, each wire guide unit comprising a wire guide member mounted for reciprocating movement in radial direction with respect to said axis for leading a wire into the path of the respective slot of the armature during the movement of said holding means and a third actuating means for effecting operation of the respective wire guide member; means for attaching said foot portions of said wire guide units to said mounting base in selected angularly spaced positions; and means operatively connected to said first, second, and third actuating means for effecting operation of the same in a cyclic sequence.

References Cited in the file of this patent

UNITED STATES PATENTS

| | | |
|---|---|---|
| 2,328,725 | Knobel | Sept. 7, 1943 |
| 2,381,750 | Hunsdorf | Aug. 7, 1945 |
| 2,632,603 | Hunsdorf | Mar. 24, 1953 |
| 2,647,696 | Brunand | Aug. 4, 1953 |
| 2,718,359 | Hunsdorf | Sept. 20, 1955 |